United States Patent [19]

Muse et al.

[11] Patent Number: 4,847,313

[45] Date of Patent: Jul. 11, 1989

[54] GEL PREVENTION IN POLYMERS

[75] Inventors: Joel Muse, Kent; Donald C. Grimm, Tallmadge; Jerry J. Dillon; Kirkwood S. Cottman, both of Akron; Calvin A. Bennett, Mogadore, all of Ohio

[73] Assignee: The Goodyear Tire & Rubber Company, Akron, Ohio

[21] Appl. No.: 172,749

[22] Filed: Mar. 28, 1988

[51] Int. Cl.$^4$ ................................................ C08K 5/37
[52] U.S. Cl. .................................. 324/291; 524/330; 524/331
[58] Field of Search ..................... 524/291, 330, 331

[56] References Cited

U.S. PATENT DOCUMENTS

| 3,984,372 | 10/1976 | Cottman | 528/205 |
| 4,168,387 | 9/1979 | Cottman | 524/291 |
| 4,707,300 | 11/1987 | Sturm et al. | 524/330 |
| 4,732,923 | 3/1988 | Takata et al. | 524/291 |

Primary Examiner—Veronica P. Hoke
Attorney, Agent, or Firm—Bruce J. Hendricks

[57] ABSTRACT

This invention is concerned with the prevention of gel formation in polymers. More specifically, this invention is directed to a unique combination of materials that greatly lessens the formation of gel in elastomers during processing and storage. The combination comprises a hindered phenolic antioxidant and an alkylated phenol/primary mercaptan/formaldehyde reaction product.

15 Claims, No Drawings

GEL PREVENTION IN POLYMERS

Technical Field

This invention relates to discovery that the combination of a polyhydroxyacrylate or polyhydroxy-methacrylate, such as 2-(2-hydroxy-3-tert.butyl-5-methylbenzene)-4-methyl-6-tert.butyl phenyl methacrylate, and the reaction product derived from the acid catalyzed reaction of an alkylated phenol, formaldehyde and a mercaptan, will provide elastomers with enhanced protection from the formation of hard gel, soft gel and micro-gel during the processing and storage of said elastomers.

BACKGROUND ART

Gel formation in polymers can be caused during the isolation and drying of the polymers from either an aqueous system or a solvent or cement system wherein localized polymer hot-spots can result in the undesirable gelling or cross-linking phenomenon. Care must be taken to assure that during the processing of elastomers that the polymer's structure is not altered which will result in degradation of the polymer's physical properties.

The process for solution polymerization of synthetic elastomers such as polybutadiene is well known in the art. Monomer and solvent are purified and dried. The catalyst is prepared separately and then added to the reaction vessel containing the monomer or monomers, for example, butadiene and styrene. When the desired degree of polymerization has been achieved, the catalyst is deactivated, the unreacted monomer or monomers and solvent are removed, and the polymer is recovered, washed, dried and baled. It is usually during the recovery process, where the elastomer is dewatered and dried that the formation of gel occurs.

Japanese Patent No. 49,066,725 discloses gelation inhibitors that are obtained by mixing solid phenylenediamine derivatives with liquid reaction products derived from aromatic amines and acetone. This patent discloses a stable suspension consisting of 100 parts of a 1:3 mixture of 4-(isopropyl-amino) diphenylamine and a toluidine-acetone condensate, 293 parts water, 2.5 parts of a 50% aqueous solution of KOH, and 4.5 parts of oleic acid. This suspension was then combined with an SBR latex at ratios of the suspension to the SBR of about 0.6:100. The rubber mixture was then flocculated to give rubber with 20% gel after 130 hours at 120° C. compared to 80% gel for rubber containing dodecylphenylamine in place of the subject suspension.

U.S. Pat. No. 3,984,372 and 4,168,387 which are incorporated herein by reference disclose esters of polyphenolics as polymerizable or built-in antioxidants. These patents disclose the use of compounds such as 2-(2-hydroxy-3-tert.butyl-5-methylbenzyl)-4-methyl-6-tert.butyl phenyl methacrylate as polymerizable antioxidants for polymeric compositions. More specifically, the compounds of these two U.S. Patents are reaction products of a polyphenolic compound such as 2,6-bis-(2-hydroxy-3-tert.butyl-5-methylbenzyl)-4-methylphenol; and 2,2'-methylene-bis-(4-methyl-6-tert.butylphenol) with an ester forming compound of the general formula:

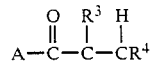

wherein $R^3$ is selected from the group consisting of hydrogen and alkyl radicals having from 1 to 4 carbon atoms, $R^4$ is selected from the group consisting of hydrogen and alkyl radicals having from 1 to 4 carbon atoms, and wherein A is selected from the group consisting of chlorine, iodine and bromine.

U.S. Pat. No. 4,707,300, which is incorporated herein by reference relates to the reaction products of an acid catalyzed simultaneous reaction between a phenol, formaldehyde and a mercaptan in specific molar ratios under specific reaction conditions. The reaction product is normally a liquid at room temperature and exhibits excellent antidegradative properties in oxidizable materials. Further, this U.S. patent is concerned with the autosynergistic phenolic reaction product itself and its incorporation into oxidizable organic materials.

The invention of this disclosure is directed to the discovery that the combination of materials disclosed in U.S. Pat. Nos. 3,984,372 and 4,168,387 with those of U.S. Pat. No. 4,707,300 lessen or prevents the formation of gel in elastomers.

There is a need in the rubber industry for a process or system which will prevent or greatly lessen the formation of gel during the isolation and processing of natural or synthetic elastomers.

DISCLOSURE OF THE INVENTION

As used herein the term esters of polyphenolics means the esters disclosed in U.S. Pat. Nos. 3,984,372 and 4,168,387. The esters of polyphenolics are prepared by reacting a polyphenolic compound of the structural formula:

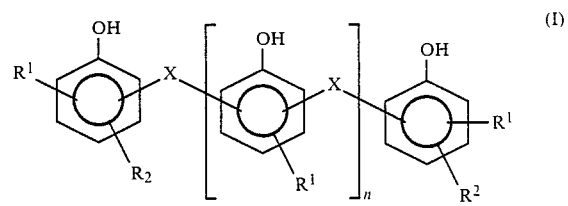

wherein $R^1$ and $R^2$ are the same or different radicals selected from the group consisting of hydrogen, alkyl radicals of 1 to 16 carbon atoms, cycloalkyl radicals of from 5 to 9 carbon atoms, aralkyl radicals of 7 to 12 carbon atoms, and substituted and unsubstituted aryl radicals of 6 to 12 carbon atoms and $R^1$ preferably contains from 1 to 2 carbon atoms when para to the hydroxyl group;

X is the same or different radical selected from the group consisting of (1) cyclic dienes with non-adjacent carbon to carbon double bonds within the ring structure containing from 5 to 20 carbon atoms from which the divalent radicals are prepared and (2) a bivalent radical selected from the group consisting of —C—, —O—,

—CH$_2$— and —S—S—;

and wherein the n is selected from the group consisting of 0 and real numbers from 1 to 5;
with a compound having the general formula:

wherein $R^3$ is selected from the group consisting of hydrogen and alkyl radicals having from 1 to 4 carbon atoms, $R^4$ is selected from the group consisting of hydrogen, alkyl radicals having from 1 to 4 carbon atoms, aralkyl radicals having from 7 to 12 carbon atoms, cycloalkyl radicals having from 5 to 8 carbon atoms and substituted or unsubstituted aryl radicals having from 6 to 12 carbon atoms, and wherein A is selected from the group consisting of chlorine, bromine and iodine.

The amount of esterification of course depends on the molar ratios and steric hindrance of the materials used. Preferably, the polyphenolic material is treated with from 0.1 mole to 1.0 mole of ester forming compound for each functional hydroxyl group. More preferably, at least one functional hydroxyl group per polyphenolic molecule is esterified.

When the polyphenolics and ester forming compounds described herein are reacted in a 1:1 molar ratio, a near theoretical reaction takes place. Compounds having the formula (I) wherein n is 0 and X is a divalent radical selected from —S— and —CH$_2$—, and wherein $R^2$ is a hydrocarbon radical of at least 4 carbon atoms (preferably tertiary) and ortho to the hydroxyl group; have only one readily reactive hydroxyl group. Upon esterification of one hydroxyl group, steric hindrance operates to decrease the reaction at the second hydroxyl site. For example, if one mole of methacryloyl chloride is reacted with one mole of 2,2'-methylene-bis-(4-methyl-6-tert.butylphenol), a near theoretical amount of 2-(2-hydroxy-3-tert.butyl-5-methylbenzyl)-4-methylphenyl methacrylate is obtained.

When a polyphenolic according to structure (I) wherein $R^2$ (preferably tertiary) is ortho to the hydroxyl group and is reacted with n+2 moles of an ester forming compound having structure (II), less than n+2 moles of compound (II) will react. Normally the number of ester groups reacting with the polyphenolic reactant is not more than n plus 1.5 or less than n minus 0.75. When n is 0 the number of ester groups reacting with the polyphenolic is usually not more than 1.5 or less than 0.25.

The esterification reaction may easily take place at elevated pressure and temperatures or from 0° C. to the boiling point of the reactants. Preferably temperatures from 0° C. to 60° C. are preferred.

Representative of the esters of polyphenolics that are useful in this invention are listed below:

2-(2-hydroxy-3-tert.butyl-5-methylbenzyl)-4-methyl-6-tert.butylphenyl acrylate
2-(2-hydroxy-3-tert.butyl-5-methylbenzyl)-4-methyl-6-tert.butyl phenylmethacrylate
2-(3,5-ditert.butyl-4-hydroxybenzyl)-4-methylphenyl methacrylate
2-(3,5-ditert.butyl-4-hydroxybenzyl)-4-methylphenyl acrylate
4-(3,5-ditert.butyl-4-hydroxybenzyl) phenyl acrylate
2-(2-hydroxy-3-tert.butyl-5-methylphenylthio)-4-methyl-6-tert.butyl phenyl methacrylate
2-(3,5-ditert.butyl-4-hydroxybenzyl) phenyl methacrylate
2,6-bis(2-hydroxy-3-tert.butyl-5-methylbenzyl)-4-methylphenyl methacrylate As used herein the term autosynergistic phenolic reaction product means the reaction mixture disclosed in U.S. Pat. No. 4,707,300. The autosynergistic phenolic reaction product is derived from the process comprising:

(1) admixing one mole of a mono-alkylated phenol or a 2,4-dialkylated phenol or a mixture thereof, wherein the alkyl radical may be straight or branched and may contain from 1 to 20 carbon atoms; with
 (a) from 0.5 to 1.5 moles of a primary mercaptan of 3 to 20 carbon atoms; and
 (b) from 0 to 50% molar excess of aqueous formaldehyde based on moles of primary mercaptan when the molar ratio of mercaptan to phenol is 1.0 or greater or 0 to 100% excess of aqueous formaldehyde when the ratio of mercaptan to phenol is less than 1.0; and
 (c) from 0.04 to 20 percent by weight based on the weight of alkylated phenol of an acid catalyst; and
 (d) an adequate amount of an azeotroping solvent;
(2) heating the admixture from ambient up to 180° C., while azeotropically removing water until the production of the waters of reaction ceases; and
(3) neutralize the catalyst and isolate the products.

More specifically, the autosynergistic phenolic reaction product can be derived from the process comprising:

(1) admixing one mole of an alkylated phenol selected from the group consisting of p-cresol, m-cresol, o-cresol, 2,4-dimethylphenol, 2-tert.butyl-p-cresol, p-ethylphenol, 3-ethylphenol, p-monononylphenol, p-isopropylphenol, p-sec-butylphenol, o-sec-butylphenol, p-tert.butylphenol, 3-tert.butylphenol, p-tert.octylphenol, 2,4-dinonylphenol, and dodecylphenol; with
 (a) from 0.5 to 1.5 moles of a mercaptan of 6 to 14 carbon atoms; and
 (b) from 0.5 to 2.25 moles of aqueous formaldehyde; and
 (c) from 0.1 to 10 percent by weight based on the weight of the alkylated phenol of an acid selected from the group consisting of toluene sulfonic acid, methanesulfonic acid, xylenesulfonic acid, sulfuric acid, glacial acetic acid, boron trifluoride, and Amberlyst 15; and
 (d) an adequate amount of a solvent that will azeotrope with water;
(2) heating the admixture from ambient to 150° C. while azeotropically removing water until the production of the water of reaction ceases;
(3) neutralization of the acid and isolation of the reaction product mixture.

Thus, there is disclosed a process for the prevention or reduction of gel formation in elastomers, said process comprising adding to an elastomer in solid, latex or solution form from 0.01 to 5.0 parts per hundred of solid elastomer of a gel inhibiting composition, said composition comprising a 1:15 to 15:1 mixture by weight of (A) a ester of a polyphenolic and (B) an autosynergistic phenolic reaction product.

There is more specifically disclosed a process for the prevention or reduction of gel formation in synthetic elastomers, said process comprising adding to the elastomer from 0.01 to 5.0 phr of a gel inhibiting composition, said gel inhibiting composition comprising a 1:15 to 15:1 mixture by weight of a compound selected from the group consisting of (1)

2-(2-hydroxy-3-tert.butyl-5-ethylbenzyl)-4-ethyl-6-tert.butyl phenylmethacrylate;

2-(2-hydroxy-3-tert.butyl-5-methylbenzyl)-4-methyl-6-tert.butyl phenylmethacrylate;

2,6-bis-(2-hydroxy-3-tert.butyl-5-methylbenzyl)-4-methyl phenylmethacrylate; and 2-(2-hydroxy-3-tert.butyl-5-methylbenzyl)-4-methyl-6-tert.butyl phenylacrylate; and (2) an autosynergistic phenolic antioxidant reaction product, said autosynergistic phenolic antioxidant reaction product is derived from the process comprising:

(1) admixing one mole of a mono-alkylated phenol or a 2,4-dialkylated phenol or a mixture thereof, wherein the alkyl radical may be straight or branched and may contain from 1 to 20 carbon atoms; with (a) from 0.5 to 1.5 moles of a primary mercaptan of 3 to 20 carbon atoms; and (b) from 1 to 50% molar excess of aqueous formaldehyde based on moles of primary mercaptan when the molar ratio of mercaptan to phenol is 1.0 or greater or equal molar amount to 100% excess of aqueous formaldehyde when the ratio of mercaptan to phenol is less than 1.0; and (c) from 0.04 to 20 percent by weight based on the weight of alkylated phenol of an acid catalyst; and (d) an adequate amount of an azeotroping solvent;

(2) heating the admixture from ambient up to 180° C. while azeotropically removing water until the production of the waters of reaction ceases; and (3) neutralize the catalyst and isolate the product.

Representative of the elastomers that can benefit through the use of the instant invention include: natural rubber, and synthetic polymers including those containing carbon to carbon double bonds such as rubbery diene polymers both conjugated and non-conjugated. Representative examples of the synthetic polymers that will benefit through the use of this invention are polychloroprene and homopolymers of conjugated 1,3-dienes such as isoprene and butadiene. Copolymers of conjugated 1,3-dienes such as isoprene and butadiene with up to 50 percent by weight of at least one copolymerizable monomer such as ethylenically unsaturated monomers such as styrene and acrylonitrile are included. Butyl rubbers and polyurethanes which contain carbon to carbon double bonds can also benefit from the instant invention. In general, any organic material that is subject to gel formation or undesired crosslinking during preparation and/or processing will benefit from this invention.

The gel inhibiting mixture of this invention may be used with or without antioxidants, antiozonants, vulcanizing agents, synergists, accelerators or other compounding ingredients known in the art. The amount of the gel inhibiting mixture may vary somewhat depending on the type and requirement of the elastomer to be protected.

The method of addition of the gel inhibiting composition to the material to be protected is not critical. It may be added by any of the conventional means such as by adding to a polymer latex, milling on an open mill or by internal mixing. When the composition of this invention is used to protect rubbers such as styrene/butadiene rubber or polybutadiene, a convenient method of incorporation consists of adding the stabilizer to the polymer while it is in latex or cement forms. This is preferably done after the polymerization of the monomers is essentially complete.

Normally from about 0.001 part to about 5.0 parts of the gel inhibiting composition by weight based on the weight of the polymer can be used: however, the precise amount to be employed will depend on the nature of the polymer and the processing conditions to which the elastomer will be exposed. It has been found that an effective amount of the composition will generally range from about 0.01 to about 3.0 parts by weight although it is commonly preferred to use from about 0.25 to about 2.0 part by weight based on 100 parts by weight of the elastomer. The above limits are merely guidelines and those skilled in this art will readily appreciate the proper amount of the composition that will be required to lessen or eliminate the formation of gel.

The following examples are submitted to illustrate and not to limit the scope of this invention.

BEST MODE

Example 1

Preparation of Methacrylate

One hundred grams of 2,2'-methylene-bis-4-methyl-6-tert.butylphenol) and 50 grams of triethylamine were dissolved in 150 milliliters of tetrahydrofuran. Thirty-one grams of methacryloyl chloride were added over a 10 minute period. The reaction product was stirred at 65° C. to 75° C. for 1 hour and then filtered. The volatiles were removed under a vacuum. The product was recrystallized from petroleum ether yielding nearly pure 2-(2-hydroxy-3-tert.butyl-5-methylbenzyl)-4-methyl-6-tert.butyl phenylmethacrylate having a melting point between 141° C. and 142° C.

Example 2

Preparation of Acrylate

This example was carried out in the same manner as Example 1 except that equal molar amounts of acryloyl chloride was used in place of methacryloyl chloride.

Example 3

Preparation of Autosynergistic Reaction Product

The autosynergistic phenolic antioxidant reaction product used herein was prepared in a production scale reaction vessel equipped with the appropriate controls.

To the empty reactor was rapidly charged 121 kgs of p-nonyl phenol, 111 kgs of dodecylmercaptan, 6.4 kgs of aqueous toluene sulfonic acid (a 70% TSA/30% water by weight solution) and 53.5 kgs of toluene. 56 kgs of formalin (a 37% formaldehyde, 15% methanol, 48% water by weight solution) was then added to the reactor as fast as possible with cooling to limit the temperature rise since the addition of the formaldehyde initiates an exothermic reaction. The addition of the formalin took about 35 minutes while the temperature of the reaction rose from ambient to about 45° C. The mixture was then reacted for about 1 hour at 60° C.

The water of solution and production and the toluene were then distilled off at a final pot temperature of 140° C. The mixture was then cooled to less than 98° C. and the toluene sulfonic acid was then neutralized with an appropriate amount of sodium carbonate. The water layer was removed and the product was again washed with water. The mixture was then vacuum distilled to remove the remaining toluene at 160° C. and 25 mm of Hg. The product was filtered to remove traces of residual salts.

The antigelling composition of this invention which consists of the ester of a polyphenolic and the autosynergistic phenolic reaction product can easily be added to the polymer in the form of a solution. Useful solvents for the antigelling composition include hexane and the like. Usually, the solution of the antigelling agents is added to the polymeric cement or latex prior to the quenching system which utilizes the addition of water to form a crumb. The crumb is then dewatered and dried through mechanical means such as screws.

In the evaluations, 10 grams of the selected material (controls) or combination of materials (ester plus reaction product at different ratios) were dissolved in 90 grams of an appropriate solvent such as hexane. These solutions were then added to the rubber cements at the indicated levels. During the isolation and storage of the elastomers, soft gel or microgel forms within the polymer which results in an undesirable product that is difficult to process. In order to simulate the formation of gel during the processing, a test was developed to evaluate the formation of gel in the polymer during the extrusion drying step. The following examples and discussion will be based upon the use of polybutadiene; however, it must be understood that other elastomers, subject to gel formation, will benefit from the invention described herein.

The mastication test has been found to correlate well with the gel formation experienced in the commercial processing of polybutadiene. The lab test used to evaluate the instant invention uses a Haake mastication apparatus at temperatures and times near the commercially encountered conditions of 100°–250° C. and a few seconds of residence time to about 15 minutes. It was determined through experimentation that the developed test correlates far better than a 70° C. oven agings with the conditions encountered in the commercial production of polybutadiene.

The mastication test uses a Haake Brabender with a #750 mixing head and banbury rotors. A computer is used to control temperature, rotor speed and run times. The mixing head temperature was 200° C. and the banbury rotor speed was 70 rpm. The test times were varied from 4 to 20 minutes.

The test samples were prepared by adding the appropriate amount of the antigelling solution to a sufficient amount of polymer cement containing 100 grams of dry rubber. The stabilized polymer is then placed in a laboratory hood and dried for about 24 hours. After drying the stabilized polymer is ready for testing.

The mastication test device after reaching temperature equilibrium was started and 50 grams of stabilized polymer was loaded into the mixing chamber and the ram with 5 kgs of weight was lowered into position. After the specified time, the ram was raised and a 2-4 gram sample was removed from the mixing chamber. The ram was then again lowered into position and the test continued. In similar fashion, a number of samples are removed from the device at specified intervals of time.

The samples removed for gel testing were allowed to cool to room temperature and then placed in plastic bags to prevent contamination awaiting analysis for percent gel.

In general the gel test consists of treating the sample with a solvent such as MEK or toluene. The amount of gel is determined from the weight of the polymer not dissolved in the solvent as a percentage of the total polymer weight. Percent gel values are related to the amount of crosslinking present in a polymer.

Specifically the percent is determined by weighing out approximately 0.2 grams of the sample (cut into small pieces) to the nearest 0.0001 grams into a sealable bottle. It is very important that all measurements be made at constant temperature. Thus, the solvent and samples should be at a constant temperature before gel measurement is initiated.

One hundred ml of the solvent is then added to the bottle containing the polymer sample. The bottle is then sealed and placed on a wrist shaker for 16 hours followed by centrifugation at 2000-2500 rpm for at least one hour or until turbidity is no longer observable. The bottle is removed from the centrifuge and a 20 ml aliquot from the upper half of the solution is transferred to a clean tared aluminum pan.

Approximately 35-40 ml of the remaining solution is poured into a pressure filtration apparatus containing a membrane filter compatible with the solvent. The solution is pressure filtered using pressurized nitrogen into a clean and dry bottle. Filtration should be stopped as soon as the filtration rate cannot be maintained. The total volume filtered should be recorded. One aliquot (2–20 ml) of the filtered solution is transferred to a clean tared aluminum pan, covered and placed in a cool vented place for evaporation of the solvent. After all the solvent was evaporated the pans are placed in an oven at about 70° C. until a constant weight is realized. Using the weight of the initial sample W1, the weight of the dried residues from the unfiltered-W2 and the filtered W-3 solutions and the aliquot size of the filtered solution used divided into 100-Y; the percent normal macrogel, % GN, microgel % GM and total gel % GT is calculated using the following expressions:

$$\% \; GN = W1 - \frac{(W2 \times 5) \times 100}{W1}$$

$$\% \; GT = W1 - \frac{(W3 \times Y) \times 100}{W1}$$

$$\% \; GM = \% \; GT - \% \; GN$$

Different gel prevention systems were evaluated in the mastication test and samples were taken at various times and analyzed for gel content. The results are listed in Table I.

TABLE I

| | Haake Mastication Test % Total Gel | | | | | |
|---|---|---|---|---|---|---|
| Sample No. | Antioxidant System | 4 min. | 6 min. | 8 min. | 10 min. | 20 min. |
| 1 | 0.75 phr butylated hydroxytoluene (Control) | 5.2 | 13.7 | 26.9 | 32.3 | — |
| 2 | 0.5 phr A0451*/0.25 phr butylated hydroxytoluene (Control) | 0.6 | 7.0 | 28.4 | 26.1 | 46.0 |
| 3 | 0.5 phr A0451 (Control) | 1.8 | 7.0 | 15.4 | 24.7 | — |
| 4 | 0.5 phr A0451/0.25 phr butylated hydroxytoluene/ 0.25 phr product of Ex. 2 (Control) | 2.1 | 4.3 | 7.4 | 21.3 | 31.2 |
| 5 | 0.5 phr product from Ex. 3 | 5.8 | 20.4 | 29.0 | 33.8 | 47.2 |
| 6 | 0.75 phr product from Ex. 3 | — | 3.0 | 19.7 | 24.1 | — |

TABLE I-continued

| Sample No. | Antioxidant System | Haake Mastication Test % Total Gel | | | | |
|---|---|---|---|---|---|---|
| | | 4 min. | 6 min. | 8 min. | 10 min. | 20 min. |
| 7 | 0.5 phr product from Ex. 3/0.25 phr product of Ex. 2 | 3.1 | 7.1 | 18.6 | 21.3 | 36.3 |
| 8 | 0.75 phr product from Ex. 3/0.2 phr of product from Ex. 2 | — | 3.0 | 7.4 | 7.2 | — |
| 9 | 1.0 phr product from Ex. 3/0.2 phr of product from Ex. 2 | — | 1.3 | 4.5 | 13.3 | — |
| 10 | 0.88 phr product from Ex. 3/0.08 phr of product from Ex. 2 | — | — | 12.3 | 23.6 | — |
| 11 | 0.88 phr product from Ex. 3/0.08 phr of product from Ex. 1 | — | — | 14.1 | 23.2 | — |

— = no sample taken

*A0451 is a reaction product of one mole of hydroquinone with at least two moles of an alpha-olefin containing at least 12 carbon atoms. See U.S. Pat. No. 3,772,393.

From the information contained in Table I, it is quite evident that the phenolic reaction product when used alone (Sample No. 5) did not prevent gel formation as well as the commercially accepted butylated hydroxytoluene/alkylated hydroquinone system (Sample No. 2). However, combinations of the ester of a polyphenolic and the phenolic reaction product slowed gel formation longer than any other system tested. One unexpected result of the instant invention is evidenced in samples 8 and 9 which contained the ester of a polyphenolic in combination with the phenolic reaction product demonstrated gel levels below 20% after 10 minutes of mastication.

Example 4

Varying Levels

A designed experiment was conducted to determine the optimum levels of the phenolic reaction product and the ester of a polyphenolic. The levels of antigelling composition were varied from 0.05 to 0.20 phr of the ester and from 0.2 to 1.0 phr of the phenolic reaction product. The gel results at 8 minutes mastication for the designed experiment are shown in Table II together with controls.

TABLE II

Various Levels of Components
% Levels of Gel after 8 Minutes on Haake Test

| Sample No. | phr of R.P. from Ex. 3 | phr of Ester from Ex. 2 | phr of A0451 | % Total Gel |
|---|---|---|---|---|
| 12 | Control | — | 0.05 | 0.6 | 28.8 |
| 13 | Control | — | 0.075 | 0.3 | 43.7 |
| 14 | Control | — | 0.125 | 0.2 | 53.6 |
| 15 | Control | — | 0.125 | 0.6 | 31.7 |
| 16 | Control | — | 0.125 | 1.0 | 6.7 |
| 17 | Control | — | 0.175 | 0.3 | 42.4 |
| 18 | Control | — | 0.175 | 0.9 | 21.4 |
| 19 | Control | — | 0.075 | 0.9 | 22.2 |
| 20 | 0.5 | 0.0 | — | 29.0 |
| 21 | 0.75 | 0.0 | — | 19.7 |
| 22 | 1.0 | 0.0 | — | 23.8 |
| 23 | 0.6 | 0.05 | — | 20.3 |
| 24 | 0.3 | 0.08 | — | 28.3 |
| 25 | 0.88 | 0.08 | — | 5.4 |
| 26 | 0.75 | 0.1 | — | 12.4 |
| 27 | 1.0 | 0.1 | — | 4.8 |
| 28 | 0.2 | 0.125 | — | 39.1 |
| 29 | 0.6 | 0.125 | — | 25.2 |
| 30 | 1.0 | 0.125 | — | 5.9 |
| 31 | 0.3 | 0.175 | — | 25.2 |
| 32 | 0.88 | 0.175 | — | 4.9 |
| 33 | 0.6 | 0.2 | — | 16.5 |
| 34 | 0.75 | 0.2 | — | 7.4 |
| 35 | 1.0 | 0.2 | — | 4.5 |

The data from the designed experiment demonstrate that increasing the level of the phenolic reaction product or the ester lowers the gel level. All the samples with levels of ester greater than 0.08 phr and phenolic reaction product greater than 0.88 phr had gel levels of less than 10%. As demonstrated previously, the use of the ester or the phenolic reaction product alone did not afford any protection from gel formation. In addition, testing of the samples revealed that incorporation of the ester and the autosynergistic phenolic reaction product did not affect the cure rate or scorch adversely when compared with the system conventionally used in the art. An aging study was conducted and it was determined that the compounds age in a manner similar to compounds containing conventional antigelling compositions.

Example 5

The ester of a polyphenolic [also known as 2,2'-methylenebis(6-t-butyl-p-phenyl)methacrylate] prepared in Example 1 was evaluated with the autosynergistic phenolic reaction product from Example 3. Samples with various levels of the ester and the reaction product were analyzed for percent gel after 6, 8, and 10 minutes on the Haake tester at 200° C. Table III sets forth the data.

TABLE III

| Components | Control | 36 | 37 | 38 | 39 | 40 | 41 | 42 | 43 | 44 | 45 | 46 | 47 |
|---|---|---|---|---|---|---|---|---|---|---|---|---|---|
| Budene | 100.0 | 100.0 | 100.0 | 100.0 | 100.0 | 100.0 | 100.0 | 100.0 | 100.0 | 100.0 | 100.0 | 100.0 | 100.0 |
| R.P. of Ex. 3 | 1.0 | 1.5 | 0.7 | 0.6 | 0.5 | 0.4 | 1.2 | — | — | — | — | — | — |
| Product of Ex. 1 | — | — | 0.3 | 0.4 | 0.5 | 0.6 | 0.3 | — | — | — | 0.25 | 0.50 | 1.0 |
| Product of Ex. 2 | — | — | — | — | — | — | — | 0.25 | 0.50 | 1.0 | — | — | — |
| | | | | | | | % GEL | | | | | | |
| 6 min. at 200° C. | 21.9 | 21.9 | 13.5 | 7.3 | 18.5 | 8.5 | 1.7 | 55.0 | 49.1 | 36.2 | 55.1 | 51.5 | 36.4 |
| 8 min. at 200° C. | 31.3 | 33.2 | 24.8 | 17.4 | 24.2 | 19.4 | 16.2 | — | — | — | — | — | — |
| 10 min. at 200° C. | 42.2 | 34.7 | 29.5 | 24.7 | 30.5 | 29.2 | 22.9 | — | — | — | — | — | — |

Industrial Applicability

The results from the tests conducted herein amply demonstrate that the combination of a ester of a polyphenolic with the autosynergistic phenolic reaction product is very useful in the prevention of gel formation in synthetic elastomers. The instant invention provides a system that is low in cost, easy to manufacture without attendant pollution problems and provides unexpectedly superior antigelling protection. The antigelling composition of this invention will have utility in the industry since it alleviates problems that have heretofore been tolerated in the manufacture and storage of elastomers.

While certain representative embodiments and details have been shown for the purpose of illustrating the invention, it will be apparent to those skilled in the art that various changes and modifications may be made therein without departing from the scope of the invention.

What is claimed is:

1. A process for the prevention or reduction of gel formation in elastomers, said process comprising adding to an elastomer in solid, latex or solution form from 0.01 to 5.0 parts per hundred of solid elastomer of a gel inhibiting composition wherein said elastomer is selected from the group consisting of natural rubber and synthetic polymers containing carbon to carbon couble bonds, said gel inhibiting composition comprising a 1:15 to 15:1 mixture by weight of (A) an ester of a polyphenolic prepard by reacting a polyphenolic compound of the structural formula:

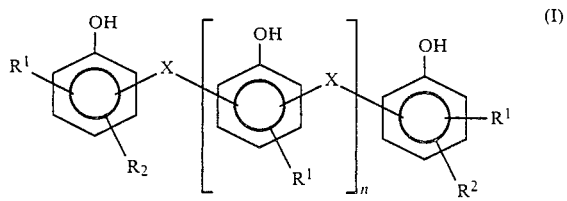

wherein $R^1$ and $R^2$ are the same or different radicals selected from the group consisting of hydrogen, alkyl radicals of 1 to 16 carbon atoms, cycloalkyl radicals of from 5 to 9 carbon atoms, aralkyl radicals of 7 to 12 carbon atoms, and substituted and unsubstituted aryl radicals of 6 to 12 carbon atoms; X is the same or different radical selected from the group consisting of (1) cyclic dienes with non-adjacent carbon to carbon double bonds within the ring structure containing from 5 to 20 carbon atoms from which the divalent radicals are prepared and (2) a bivalent radical selected from the group consisting of: —C—, —O—,

$CH_2$— and —S—S—; and wherein the n is selected from the group consisting of 0 and real numbers from 1 to 5; with a compound having the general formula:

wherein $R^3$ is selected from the group consisting of hydrogen and alkyl radicals having from 1 to 4 carbon atoms, $R^4$ is selected from the group consisting of hydrogen, alkyl radicals having from 1 to 4 carbon atoms, aralkyl radicals having from 7 to 12 carbon atoms, cycloalkyl radicals having from 5 to 8 carbon atoms and substituted or unsubstituted aryl radicals having from 6 to 12 carbon atoms, and whrein A is selected from the group consisting of chlorine, bromine and iodine; and (B) an autosynergistic phenolic reaction product, said autosynergistic phenolic antioxidant reaction product being derived from a process comprising:
 (1) admixing one mole of a mono-alkylated phenol or a 2,4-dialkylated phenol or a mixture thereof, whrein the alkyl radical may be straight or branched and may contain from 1 to 20 carbon atoms; with
  (a) from 0.5 to 1.5 moles of a primary mercaptan of 3 to 20 carbon atoms; and
  (b) from 0 to 50% molar excess of aqueous formaldehyde based on moles of primary mercaptan when the molar ratio of mercaptan to phenol is 1.0 or greater or 0 to 100% excess of aqueous formalaehyde when the ratio of mercaptan to phenol is less than 1.0; and
  (c) from 0.04 to 20 percent by weight based on the weight of alkylated phenol of an acid catalyst; and
  (d) an adequate amount of an azeotroping solvent;
 (2) heating the admixture from ambient up to 180° C., while azeotropically removing water until the production of the waters of reaction ceases; and
 (3) neutralize the catalyst and isolate the products.

2. The process according to claim 1 wherein the gel inhibiting composition concentration is from 0.01 to 3.0.

3. The process according to claim 1 wherein the gel inhibiting composition concentration is from 0.25 to 3.0.

4. The process according to claim 1 wherein said composition comprises a 1:10 to 10:1 mixture by weight of (A) an ester of a polyphenolic and (B) an autosynergistic phenolic reaction product.

5. The process according to claim 1 wherein said composition comprises a 1:5 to 5:1 mixture by weight of (A) an ester of a polyphenolic and (B) an autosynergistic phenolic reaction product.

6. The process according to claim 1 wherein (A) the ester of a polyphenolic is selected from 2-(2-hydroxy-3-tert.butyl-5-methylbenzyl)-4-methyl-6-tert.butyl phenylmethacrylate and 2-(2-hydroxy-3-tert.butyl-5-methylbenzyl)-4-methyl-6-tert.butyl phenylacrylate.

7. The process according to claim 1 wherein the elastomer is selected from natural rubber, polybutadiene and SBR.

8. A process for the prevention or reduction of gel formation in polymeric elastomers, said process comprising adding to the elastomer from 0.01 to 5.0 phr of a gel inhibiting composition, wherein said elastomer is selected from the group consisting of natural rubber and synthetic polymers containing carbon to carbon double bonds, said gel inhibiting composition comprising a 1:15 to 15:1 mixture by weight of a compound selected from the group consisting of (1) 2-(2-hydroxy-3-tert.butyl-5-ethylbenzyl)-4-ethyl-6-tert.butyl 1) [phenylmetharylate; 2-(2-hydroxy-3-tert.butyl-5-methylbenzyl)-4-methyl-6-tert.butyl phenylmethacrylate; 2,6-bis-(2-hydroxy-3-tert.butyl-5-methylbenzyl)-4-methyl phenylmethacrylate; and 2-(2-hydroxy-3-tert.butyl-5-methylbenzyl)-4-methyl-6-tert.butyl phenylacrylate; and (2) an autosynergistic phenolic antioxidant reaction product, said autosynergistic phenolic antioxidant reaction product is derived from the process comprising:
 (1) admixing one mole of a mono-alkylated phenol or a 2,4-dialkylated phenol or a mixture thereof, wherein the alkyl radical may be straight or branched and may contain from 1 to 20 carbon atoms; with (a) from 0.5 to 1.5 moles of a primary mercaptan of 3 to 20 carbon atoms; and
(b) from 1 to 50% molar excess of aqueous formaldehyde based on moles of primary mercaptan when the molar ratio of mercaptan to phenol is 1.0 or greater or 0 to 100% excess of aqueous formaldehyde when the ratio of mercaptan to phenol is less than 1.0; and
(c) from 0.04 to 20 percent by weight based on the weight of alkylated phenol of an acid catalyst; and
(d) an adequate amount of an azeotroping solvent;
(2) heating the admixture from ambient up to 180° C. while azeotropically removing water until the production of the waters of reaction ceases; and
(3) neutralize the catalyst and isolate the products.

9. A process according to claim 6 wherein the gel inhibiting composition is present at from 0.01 to 3.0.

10. A process according to claim 6 wherein the gel inhibiting composition is present at from 0.25 to 3.0.

11. A process according to claim 6 wherein the ratio of compound (1) to compound (2) is from 1:10 to 10:1.

12. A process according to claim 6 wherein the ratio of compound (1) to compound (2) is from 1:8 to 8:1.

13. A process according to claim 6 wherein the ratio of compound (1) to compound (2) is from 1:5 to 5:1.

14. A process according to claim 6 wherein the elastomer is selected from natural rubber, polybutadiene and SBR.

15. A process according to claim 6 wherein (A) the ester of a polyphenolic is selected from
2-(2-hydroxy-3-tert.butyl-5-methylbenzyl)-4-methyl-6-tert.butyl phenylmethacrylate and
2-(2-hydroxy-3-tert.butyl-5-methylbenzyl)-4-methyl-6-tert.butyl phenylacrylate.

* * * * *